United States Patent
Jung et al.

(10) Patent No.: US 8,363,575 B2
(45) Date of Patent: Jan. 29, 2013

(54) SYSTEM AND METHOD FOR USING FREQUENCY AND TIME RESOURCES IN A COMMUNICATION SYSTEM

(75) Inventors: Young-Ho Jung, Suwon-si (KR); Jong-Hyung Kwun, Seongnam-si (KR); Yung-Soo Kim, Seongnam-si (KR); Young-Sil Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 12/201,869

(22) Filed: Aug. 29, 2008

(65) Prior Publication Data

US 2009/0059820 A1    Mar. 5, 2009

(30) Foreign Application Priority Data

Aug. 31, 2007 (KR) .................. 10-2007-0088572

(51) Int. Cl.
*H04J 3/00* (2006.01)
(52) U.S. Cl. ........ 370/280; 370/281; 370/330; 370/338; 455/522; 455/115.3
(58) Field of Classification Search .................. None
See application file for complete search history.

(56) References Cited

U.S. PATENT DOCUMENTS

| | | | |
|---|---|---|---|
| 2004/0264393 A1* | 12/2004 | Desgagne et al. | 370/294 |
| 2007/0140166 A1* | 6/2007 | Eichinger et al. | 370/329 |
| 2007/0286156 A1* | 12/2007 | Gormley et al. | 370/350 |
| 2009/0016371 A1* | 1/2009 | Zheng et al. | 370/431 |
| 2009/0029710 A1* | 1/2009 | Ochiai et al. | 455/450 |
| 2009/0067354 A1* | 3/2009 | Gao et al. | 370/310 |

FOREIGN PATENT DOCUMENTS

EP        1443794 A2 *  8/2004

* cited by examiner

*Primary Examiner* — Kibrom T Hailu
*Assistant Examiner* — Zewdu A Beyen
(74) *Attorney, Agent, or Firm* — Jefferson IP Law, LLP

(57) ABSTRACT

A method and system for using frequency resources in a communication system are provided. In the method and system, a total frequency band is divided into at least two frequency subbands and there is a guard interval between frequency subbands. A first frequency subband includes a TDD UL frequency subband and a TDD DL frequency subband. A second frequency subband includes an FDD UL frequency subband. A BS sets a frequency band between the TDD UL frequency subband and an FDD UL frequency subband as an additional UL frequency subband, and receives a signal from an MS in the additional UL frequency subband.

23 Claims, 6 Drawing Sheets

SYSTEM AND METHOD FOR USING FREQUENCY AND TIME RESOURCES IN A COMMUNICATION SYSTEM

PRIORITY

This application claims the benefit under 35 U.S.C. §119 (a) of a Korean patent application filed in the Korean Intellectual Property Office on Aug. 31, 2007 and assigned Serial No. 2007-88572, the entire disclosure of which is hereby incorporated by reference.

BACKGROUND OF THE INVENTION

1. Field of the Invention

The present invention relates to a communication system. More particularly, the present invention relates to a system and method for using frequency and time resources in a communication system.

2. Description of the Related Art

In a communication system, a transmitter can transmit a signal in at least one of Frequency Division Duplexing (FDD), Time Division Duplexing (TDD), and a combination of FDD and TDD (Hybrid Division Duplexing (HDD)).

FIG. 1A illustrates a conventional use of resources in an FDD communication system.

Referring to FIG. 1A, the FDD communication system divides a total frequency band into two frequency subbands, for example, a first frequency subband 101 and a second frequency subband 103. There is a guard interval 105 located between the first and second frequency subbands 101 and 103 in order to prevent interference.

The first frequency subband 101 is used for UpLink (UL) transmission and reception, and the second frequency subband 103 is used for DownLink (DL) transmission and reception.

FIG. 1B illustrates a conventional use of resources in an HDD communication system.

Referring to FIG. 1B, the HDD communication system divides a total frequency band into three frequency subbands, for example, a first frequency subband 111, a second frequency subband 113 and 115, and a third frequency band 117. The first frequency subband 111 is used for UL transmission and reception. The second frequency subband 113 and 115 are divided into a TDD DL band 113 and a TDD UL band 115, for DL and UL transmission and reception, respectively. The third frequency subband 117 is used for DL transmission and reception.

Guard intervals 119, 121 and 123 are located between the first frequency subband 111 and the second frequency subband 113 and 115, between the second frequency subband 113 and 115 and the third frequency subband 117, and between the TDD DL band 113 and the TDD UL band 115 in order to prevent interference. The guard interval 123 is called a Transmit/Receive Transition Gap (TTG) or a Receive/transmit Transition Gap (RTG).

As described above, a guard interval is interposed between frequency subbands to avoid interference in the communication system. Since the guard interval is an empty frequency band, a waste of resources may result.

SUMMARY OF THE INVENTION

An aspect of the present invention is to address at least the above-mentioned problems and/or disadvantages and to provide at least the advantages described below. Accordingly, an aspect of the present invention is to provide a system and method for using frequency resources to reduce resource consumption in a communication system.

Another aspect of the present invention is to provide a system and method for using frequency resources to increase the frequency use efficiency in a communication system.

In accordance with an aspect of the present invention, a method for using frequency and time resources in a BS in a communication system comprising at least two frequency subbands and a guard interval between frequency subbands is provided. A first frequency subband comprises a TDD UL frequency subband and a TDD DL frequency subband, and a second frequency subband comprises an FDD UL frequency subband. The BS sets part of a guard interval between a first frequency subband and a second frequency subband among the frequency subbands as at least one of a transmission frequency band and a reception frequency band, and communicates with a Mobile Station (MS) in the at least one frequency band.

In accordance with a further aspect of the present invention, a system for using frequency and time resources in a communication system comprising at least two frequency subbands and a guard interval between frequency subbands is provided. The communication system includes a BS, a first frequency subband comprises a TDD UL frequency subband and a TDD DL frequency subband, and a second frequency subband comprises an FDD UL frequency subband among the frequency subbands. The BS sets part of a guard interval between a first frequency subband and a second frequency subband among the frequency subbands as at least one of a transmission frequency band and a reception frequency band, and communicates with a Mobile Station (MS) in the at least one frequency band.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a system and method for using frequency and time resources to increase resource use efficiency by utilizing a guard interval that is set to avoid interference between frequency bands in a communication system. The present invention is applicable to a communication system using at least one of FDD, TDD, and HDD.

The following description is made, by way of example, in the context of a communication system in which a total frequency band is divided into a preset number of frequency subbands and a guard interval is interposed between frequency subbands.

Figure 1A:
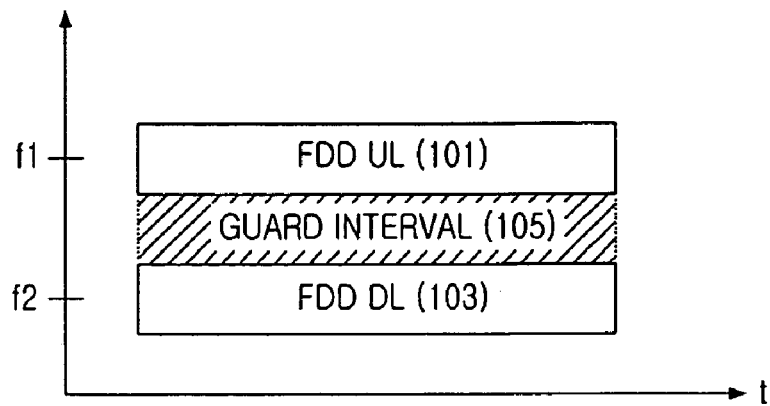
FIG. 1A illustrates a conventional use of frequency resources in an FDD communication system.
Figure 1B:
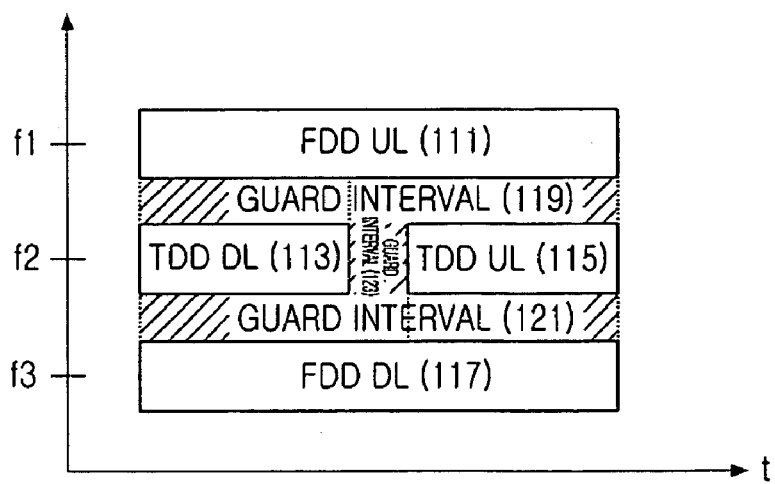
FIG. 1B illustrates a conventional use of frequency resources in an HDD communication system.
Figure 2:
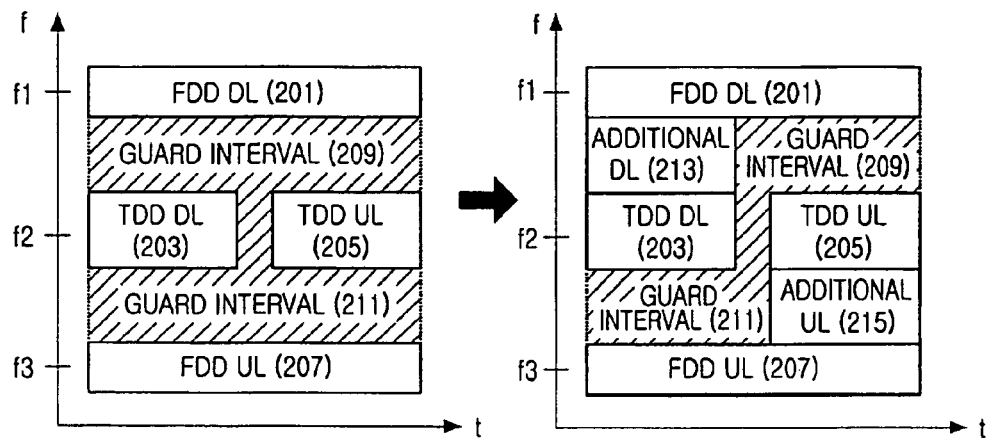
FIG. 2 illustrates a use of frequency resources in a communication system according to a first exemplary embodiment of the present invention.

FIG. 2 illustrates a use of frequency and time resources in a communication system according to a first exemplary embodiment of the present invention.

Referring to FIG. 2, a total frequency band is divided into three frequency subbands, for example, a first frequency subband (FDD DL band) 201, a second frequency subband 203 and 205, and a third frequency subband (FDD UL band) 207. The first frequency subband 201 is used for DL transmission and reception. The second frequency subband 203 and 205 is divided into a TDD DL band 203 and a TDD UL band 205, for DL and UL transmission and reception, respectively. The third frequency subband 207 is used for UL transmission and reception. A first guard interval 209 (guard interval 1) is located between the first frequency subband 201 and the second frequency subband 203 and 205, and a second guard interval 211 (guard interval 2) is located between the second frequency subbands 203 and 205 and the third frequency subband 207, in order to prevent interference.

Part 213 of the first guard interval 209 is disposed between the FDD DL band 201 and the TDD DL band 203, and part 215 of the second guard interval 211 is disposed between the TDD UL band 205 and the FDD UL band 207. These partial guard intervals 213 and 215 are referred to as "additional DL band" and "additional UL band", respectively.

As the FDD DL band 201 and the TDD DL band 203 are used for transmitting DL signals, no signal interference occurs between them. Therefore, the additional DL band 213 can be utilized for DL transmission.

Similarly, while the TDD UL band 205 and the FDD UL band 207 are used for transmitting UL signals, no signal interference occurs between them. Therefore, the additional UL band 215 can be utilized for UL transmission.

In the communication system, a first Base Station (BS) can transmit and receive signals in the FDD bands, i.e. the FDD DL band 201 and the FDD UL band 207, and a second BS can transmit and receive signals in the TDD bands, i.e. the TDD DL band 203 and the TDD UL band 205. The additional DL band 213 and the additional UL band 215 can be used for a BS that transmits and receives signals in the TDD bands, i.e. the second BS. Needless to say, the exemplary embodiment of the present invention is also applicable to a case where a single BS uses all frequency bands.

The first and second BSs can be operated by the same or different operators. Also, different operators can share the whole or part of a BS so that the BS uses all or part of the frequency bands.

More specifically, the time duration of the TDD DL band 203 may be shorter than that of the FDD DL band 201. Thus, in the context of the above example with two base stations, the second BS using the TDD DL band 203 can also use the additional DL band 213 for signal transmission. Since the time duration of the TDD UL band 205 may be shorter than that of the FDD UL band 207, the second BS using the TDD UL band 205 can also use the additional UL band 215 for signal reception. Also, in the context of the above example with one base station, the first BS can transmit and receive signals in the FDD bands, i.e. the FDD DL band 201 and the FDD UL band 207 and the TDD bands, i.e. the TDD DL band 203 and the TDD UL band 205. In this case, the first BS can use the additional DL band 213 and the additional UL band 215, for signal transmission and reception.

As described above, the BS occupying the shorter DL and UL time durations can benefit from the use the additional DL or UL resources because the additional DL/UL band 213/215 experiencing no signal interference is defined based on the shorter DL/UL time duration. That is, the additional DL band 215 is separated from the additional UL band 215 by a guard interval between the TDD DL band 203 and the TDD UL band 205. Hence, the BS can use the additional DL/UL band 213/215 independently of a communication system using the FDD FL band 201 or/and the FDD UL band 207.

In addition, the BS using the FDD DL band 201 or/and the FDD UL band 207 may be able to use the additional DL band 213 and the additional UL band 215. That is, upon receipt of information allowing use of the additional DL band 213 and the additional UL band 215 from another BS, the BS can use them.

A particular system or a particular BS will need the additional DL/UL band when there is a shortage of available band resources due to an increased number of users or due to an increased amount of information to be transmitted to users. In this case, the additional band resources can be used on a BS basis or on a system basis according to a rule or signaling for at least one of a preset inter-BS, an inter-cell, an inter-Radio Access Technology (RAT), an inter-operator, an inter-deployment and the like. When a BS or a system needs an additional band, the BS or a system uses the resources within the additional DL/UL band. While a BS and a system has been described above, the present invention is equally applicable to any BSs, systems, cells, RATs, operators, or deployments that can share frequency band resources, request resources from one another or share resources with one another by negotiations.

Requests or negotiations may be made via a direct communication path between BSs, between systems or via a backhaul. It can be further contemplated that a system or a BS requesting additional band resources may use an unused additional band by direct spectrum sensing.

Figure 3:
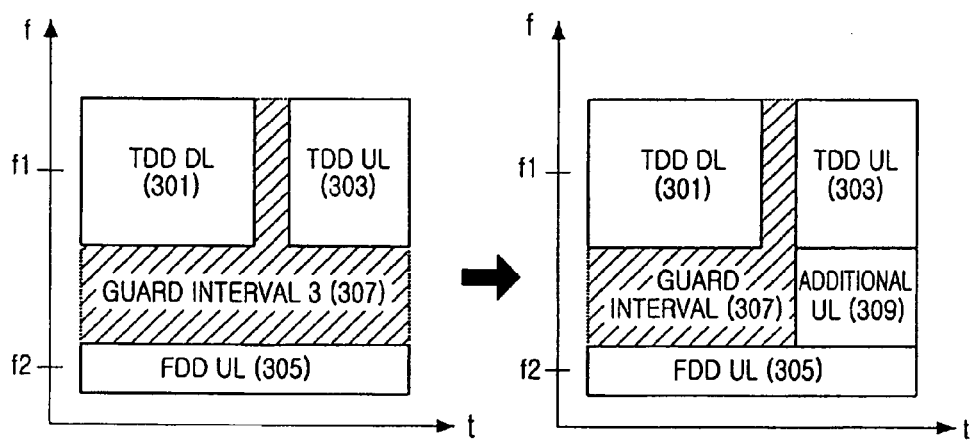
FIG. 3 illustrates a use of frequency resources in a communication system according to a second exemplary embodiment of the present invention.

FIG. 3 illustrates a use of frequency and time resources in the communication system according to a second exemplary embodiment of the present invention.

Referring to FIG. 3, a total frequency band is divided into two frequency subbands, for example, a first frequency subband 301 and 303 and a second frequency subband (FDD UL band) 305. The first frequency subband 301 and 303 are divided into a TDD DL band 301 and a TDD UL band 303, for DL and UL transmission and reception, respectively. The second frequency subband 305 is used for UL transmission and reception in FDD. A third guard interval 307 (guard interval 3) is located between the first frequency subband 301 and 303 and the second frequency subband 305.

Part 309 of the third guard interval 307 is disposed between the TDD UL band 303 and the FDD UL band 305. Since no signal interference occurs between the TDD UL band 303 and the FDD UL band 305, the additional UL band 309 can be utilized for UL transmission and reception.

For example, in the communication system, a first BS can transmit and receive signals in the TDD bands, i.e. the TDD DL band 301 and the TDD UL band 305. The additional UL band 309 can be used for a BS that transmits and receives signals in the TDD bands, i.e. the first BS. Alternatively, a second BS can use the additional UL band 309 when it is allowed to use the additional UL band 309 by the first BS or by negotiations between the first and second BSs.

More specifically, the time duration of the TDD UL band 303 is shorter than that of the FDD UL band 305. This means that the first BS using the shorter TDD UL band 303 can also use the additional UL band 309 for signal transmission.

It is clear that if the first BS uses all of the TDD bands 301 and 303 and the FDD UL band 305, the first BS may use the additional UL band 309.

Figure 4:
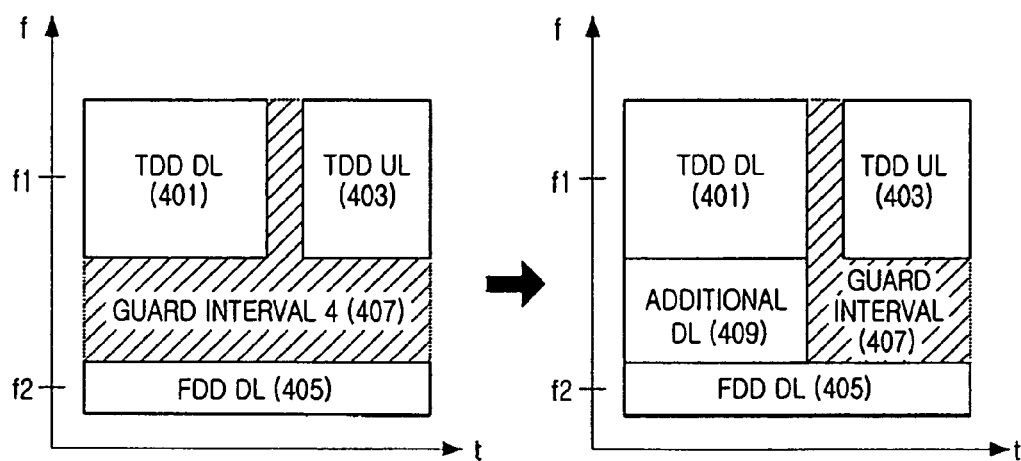
FIG. 4 illustrates a use of frequency resources in a communication system according to a third exemplary embodiment of the present invention.

FIG. 4 illustrates a use of frequency and time resources in the communication system according to a third exemplary embodiment of the present invention.

Referring to FIG. 4, a total frequency band is divided into two frequency subbands, for example, a first frequency subband 401 and 403 and a second frequency subband (FDD DL band) 405. The first frequency subband 401 and 403 is divided into a TDD DL band 401 and a TDD UL band 403, for DL and UL transmission and reception, respectively. The second frequency subband 405 is used for UL transmission and reception in FDD. A fourth guard interval 407 (guard interval 4) is located between the first frequency subband 401 and 403 and the second frequency subband 405.

Part 409 of the fourth guard interval 407 is disposed between the TDD DL band 401 and the FDD DL band 405.

Since no signal interference occurs between the TDD DL band 401 and the FDD DL band 405, the additional DL band 409 can be utilized for DL transmission and reception.

A first BS can transmit and receive signals in the TDD bands, i.e. the TDD DL band 401 and the TDD UL band 403 and a second BS can transmit a signal in the FDD DL band 405. The additional DL band 409 can be used for a BS that transmits and receives signals in the TDD bands, i.e. the first BS. Alternatively, the second BS can use the additional DL band 409 when it is allowed to use the additional DL band 409 by the first BS or by negotiations between the first and second BSs.

Figure 5:
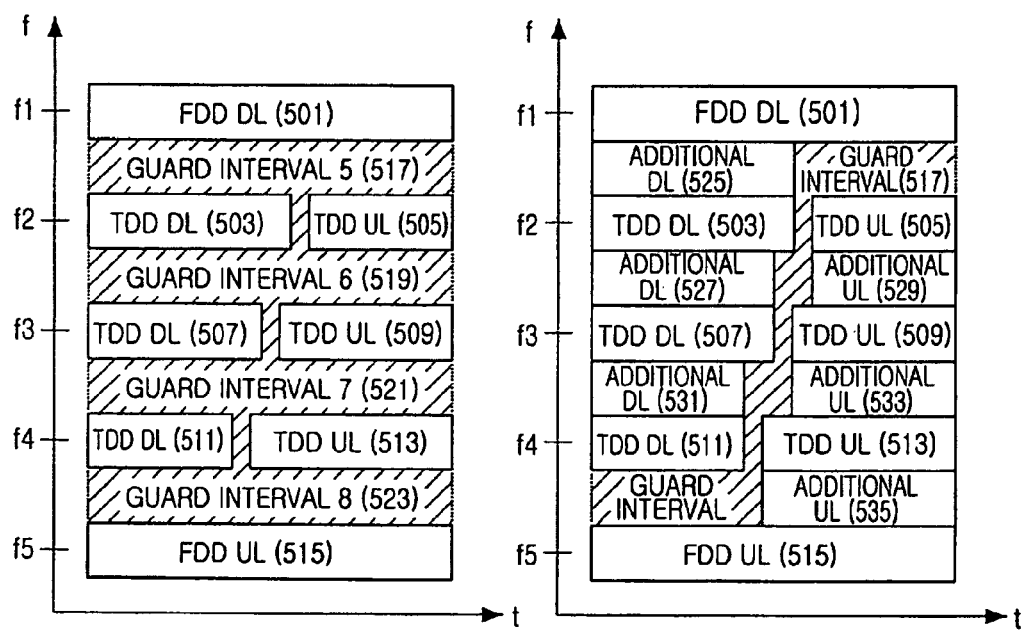
FIG. 5 illustrates a use of frequency resources in a communication system according to a fourth exemplary embodiment of the present invention.

FIG. 5 illustrates a use of frequency and time resources in the communication system according to a fourth exemplary embodiment of the present invention.

Referring to FIG. 5, a total frequency band is divided into five frequency subbands, for example, a first frequency subband (FDD DL band) 501, a second frequency subband 503 and 505, a third frequency subband 507 and 509, a fourth frequency subband 511 and 513, and a fifth frequency subband (FDD UL) 515. The first frequency subband 501 is used for DL transmission and reception in FDD. The second, third and fourth frequency subbands 503, 505, 507, 509, 511 and 513 are divided into TDD DL bands 503, 507 and 511 and TDD UL bands 505, 509 and 513, for DL and UL transmission and reception. The fifth frequency subband 515 is used for UL transmission and reception in FDD. A fifth guard interval 517 (guard interval 5) is located between the first frequency subband 501 and the second frequency subband 503 and 505, and a sixth guard interval 519 (guard interval 6) is located between the second frequency subband 503 and 505 and the third frequency subband 507 and 509. A seventh guard interval 521 (guard interval 7) exists between the third frequency subband 507 and 509 and the fourth frequency subband 511 and 513, and an eighth guard interval 523 (guard interval 8) exists between the fourth frequency subband 511 and 513 and the fifth frequency subband 515.

Similar to that described above, additional DL bands 525, 527 and 531 can be used for DL transmission and reception, and additional UL bands 529, 533 and 535 can be used for UL transmission and reception.

A first BS can transmit and receive signals in the FDD DL band 501 and the FDD UL band 503 and a second BS can transmit and receive signals in the TDD DL bands 503, 507 and 511 and the TDD UL bands 505, 509 and 513. The additional DL bands 525, 527 and 531 and the additional UL bands 529, 533 and 535 can be used for a BS that transmits and receives signals in the TDD bands, i.e. the second BS.

More specifically, the time duration of the TDD DL band 503 is shorter than that of the FDD DL band 501. This means that the second BS using the TDD DL band 503 may also use the additional DL band 525.

Since the time duration of the TDD DL band 507 is shorter than that of the TDD DL band 503, the second BS using the TDD DL band 507 may also use the additional DL band 527.

The time duration of the TDD DL band 511 is shorter than that of the TDD DL band 507. This means that the second BS using the TDD DL band 511 may also use the additional DL band 531.

The time duration of the TDD UL band 513 is shorter than that of the FDD UL band 515. This means that the second BS using the TDD UL band 513 may also use the additional UL band 535.

The time duration of the TDD UL band 509 is shorter than that of the TDD UL band 513. This means that the second BS using the TDD UL band 509 may also use the additional UL band 533.

The time duration of the TDD UL band 505 is shorter than that of the TDD UL band 509. This means that the second BS using the TDD UL band 505 may also use the additional UL band 529.

If the first BS occupies the long FDD DL and UL bands 501 and 505 and wants to use the additional DL and UL bands 525 and 535, it may notify the second BS that it will use the additional DL and UL bands 525 and 335 by signaling between the first and second BSs.

Figure 6:
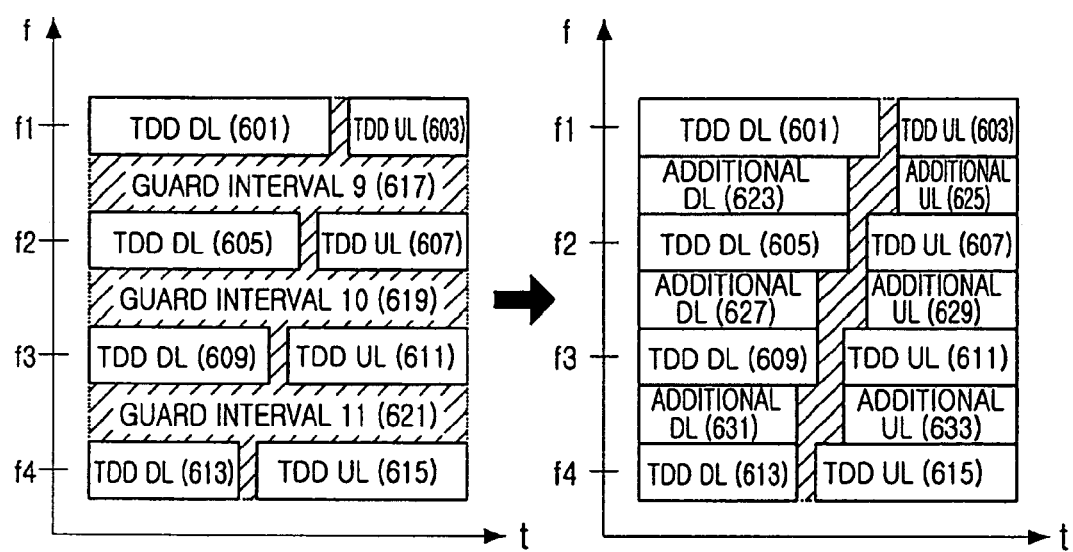
FIG. 6 illustrates a use of frequency resources in a communication system according to a fifth exemplary embodiment of the present invention.
Figure 7A:
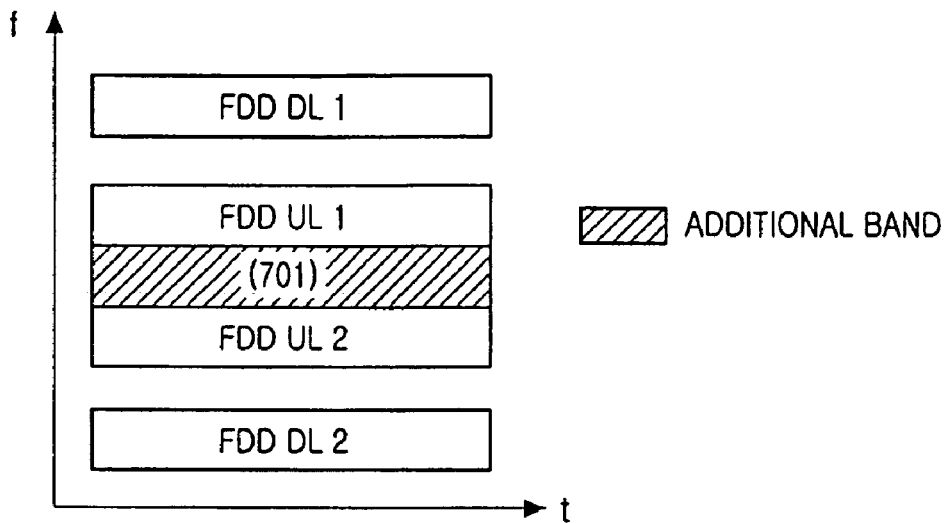
FIGS. 7A to 7D illustrate a use of frequency resources in a communication system according to a sixth exemplary embodiment of the present invention.
Figure 7B:
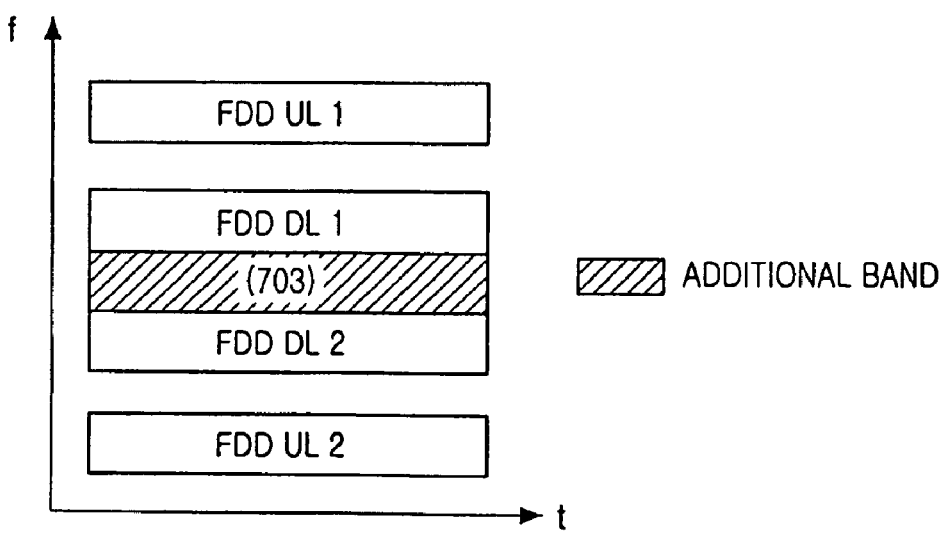
Figure 7C:
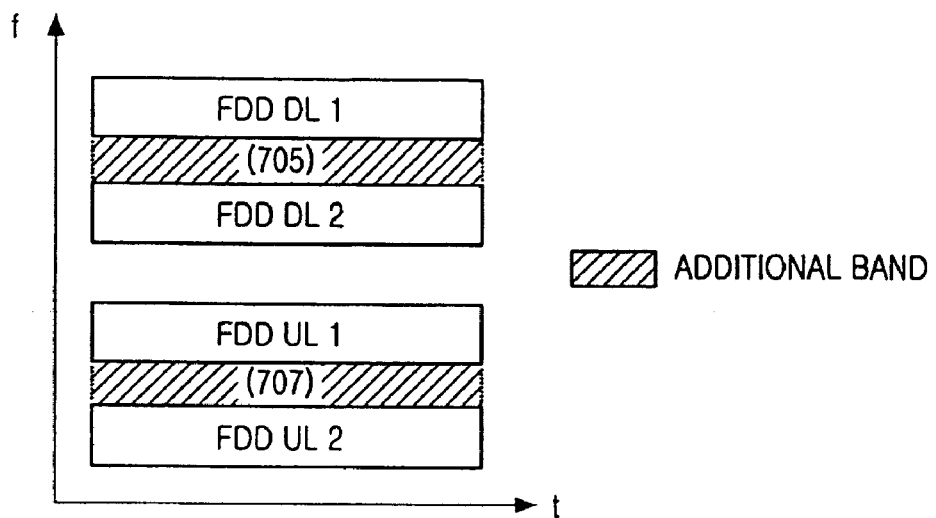
Figure 7D:
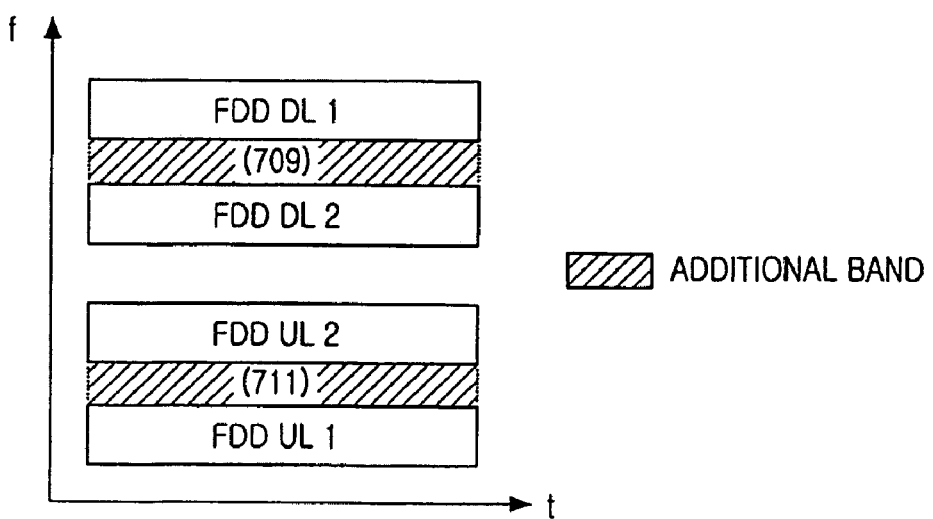

FIG. 6 illustrates a use of frequency and time resources in the communication system according to a fifth exemplary embodiment of the present invention. FIG. 6 will be described in the context of a communication system with multiple TDD bands.

Referring to FIG. 6, a total frequency band is divided into four frequency subbands, for example, a first frequency subband 601 and 603, a second frequency subband 605 and 607, a third frequency subband 609 and 611, and a fourth frequency subband 613 and 615.

The first to fourth frequency subbands 601 to 615 are divided into TDD DL bands 601, 605, 609 and 613 and TDD UL bands 603, 607, 611 and 615, for DL and UL transmission and reception. A ninth guard interval 617 (guard interval 9) is located between the first frequency subband 601 and 603 and the second frequency subband 605 and 607, and a tenth guard interval 619 (guard interval 10) is located between the second frequency subband 605 and 607 and the third frequency subband 609 and 611. An eleventh guard interval 621 (guard interval 11) is located between the third frequency subband 609 and 611 and the fourth frequency subband 613 and 615.

Similar to that described above, additional DL bands 623, 627 and 631 can be used for DL transmission and reception, and additional UL bands 625, 629 and 633 can be used for UL transmission and reception.

The first to fourth frequency subbands 601 to 615 are used separately as TDD DL bands and TDD UL bands which may have various occupancy ratios. That is, additional DL bands and additional UL bands defined in part of the guard intervals among the frequency subbands may have different occupancy ratios.

That is, if frequency subbands have different TDD DL-TDD UL band occupancy ratios, the TDD DL bands and the TDD UL bands are arranged in the frequency subbands in the order of TDD DL-TDD UL band occupancy ratios to maximize additional DL-UL band occupancy ratios.

FIGS. 7A to 7D illustrate a use of frequency and time resources in the communication system according to a sixth exemplary embodiment of the present invention.

In FIGS. 7A to 7D, examples of using additional band resources among FDD communication systems are illustrated. Guard intervals 701, 707 and 711 between existing UL bands are defined as additional UL bands and guard intervals 703, 705, and 709 between existing DL bands are defined as additional DL bands.

As described above, exemplary embodiments of the present invention advantageously reduce resource consumption and increases frequency use efficiency by utilizing a guard interval allocated to reduce signal interference between frequency bands in a communication system.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for using frequency and time resources by a Base Station (BS) in a communication system comprising at least two frequency subbands and a guard interval between the at least two frequency subbands, the method comprising:
    setting part of a guard interval between a first frequency subband and a second frequency subband among the at least two frequency subbands as at least one of a transmission frequency band and a reception frequency band, according to whether the first frequency subband and the second frequency subband are used as the transmission frequency band or the reception frequency band; and
    communicating with a Mobile Station (MS) in at least one set frequency band,
    wherein the part of the guard interval is used as the transmission frequency band when the first frequency subband and the second frequency subband are used as the transmission frequency band,
    wherein the part of the guard interval is used as the reception frequency band when the first frequency subband and the second frequency subband are used as the reception frequency band, and
    wherein the at least one set frequency band has a time duration equal to a shorter time duration of the first frequency subband and the second frequency subband.

2. The method of claim 1, wherein the first frequency subband is used for the BS and the second frequency subband is used for another BS.

3. The method of claim 1, wherein each of the first frequency subband and the second frequency subband is one of a Time Division Duplexing (TDD) Uplink (UL) frequency subband and a TDD Downlink (DL) frequency subband.

4. The method of claim 1, wherein each of the first frequency subband and the second frequency subband is one of a Frequency Division Duplexing (FDD) UL frequency subband and an FDD DL frequency subband.

5. The method of claim 1, wherein the first frequency subband is an FDD DL frequency subband and the second frequency subband is a TDD DL frequency subband.

6. The method of claim 1, wherein the first frequency subband is an FDD DL frequency subband and the second frequency subband is a TDD UL frequency subband.

7. The method of claim 1, wherein the first frequency subband is an FDD UL frequency subband and the second frequency subband is a TDD DL frequency subband.

8. The method of claim 1, wherein the first frequency subband is an FDD UL frequency subband and the second frequency subband is a TDD UL frequency subband.

9. The method of claim 1, wherein the at least one set frequency band has a bandwidth equal to the shorter of bandwidths of the first frequency subband and the second frequency subband.

10. The method of claim 1, wherein the at least one set frequency band has a bandwidth preset by the BS.

11. The method of claim 1, wherein the at least one set frequency band is shared with another BS communicating with the BS.

12. The method of claim 1, wherein the at least one set frequency band is determined by spectrum sensing of the BS.

13. A Base Station (BS) for using frequency and time resources in a communication system comprising at least two frequency subbands and a guard interval between the at least two frequency subbands, the BS comprising:
    a controller for setting part of a guard interval between a first frequency subband and a second frequency subband among the at least two frequency subbands as at least one of a transmission frequency band and a reception frequency band, according to whether the first frequency subband and the second frequency subband are used as the transmission frequency band or the reception frequency band;
    a transceiver for communicating with a Mobile Station (MS) in at least one set frequency band,
    wherein the part of the guard interval is used as the transmission frequency band when the first frequency subband and the second frequency subband are used as the transmission frequency band,
    wherein the part of the guard interval is used as the reception frequency band when the first frequency subband and the second frequency subband are used as the reception frequency band, and
    wherein the at least one set frequency band has a time duration equal to a shorter time duration of the first frequency subband and the second frequency subband.

14. The BS of claim 13, wherein each of the first frequency subband and the second frequency subband is one of a Time Division Duplexing (TDD) Uplink (UL) frequency subband and a TDD Downlink (DL) frequency subband.

15. The BS of claim 13, wherein each of the first frequency subband and the second frequency subband is one of a Frequency Division Duplexing (FDD) UL frequency subband and an FDD DL frequency subband.

16. The BS of claim 13, wherein the first frequency subband is an FDD DL frequency subband and the second frequency subband is a TDD DL frequency subband.

17. The BS of claim 13, wherein the first frequency subband is an FDD DL frequency subband and the second frequency subband is a TDD UL frequency subband.

18. The BS of claim 13, wherein the first frequency subband is an FDD UL frequency subband and the second frequency subband is a TDD DL frequency subband.

19. The BS of claim 13, wherein the first frequency subband is an FDD UL frequency subband and the second frequency subband is a TDD UL frequency subband.

20. The BS of claim 13, wherein the at least one set frequency band has a bandwidth equal to a shorter bandwidth of bandwidths of the first frequency subband and the second frequency subband.

21. The BS of claim 13, wherein the at least one set frequency band has a bandwidth preset by the BS.

22. The BS of claim 13, wherein the at least one set frequency band is shared with another BS communicating with the BS.

23. The BS of claim 13, wherein the at least one set frequency band is determined by spectrum sensing of the BS.

* * * * *